US008255983B2

(12) United States Patent
Schultz et al.

(10) Patent No.: US 8,255,983 B2
(45) Date of Patent: Aug. 28, 2012

(54) METHOD AND APPARATUS FOR EMAIL COMMUNICATION

(75) Inventors: Göran Schultz, Espoo (FI); Patrik Salmela, Kirkkonummi (FI); Amin Parth Ileshkumar, Espoo (FI); Riikka Susitaival, Helsinki (FI); Stefan Wager, Espoo (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 678 days.

(21) Appl. No.: 12/414,957

(22) Filed: Mar. 31, 2009

(65) Prior Publication Data

US 2010/0250929 A1 Sep. 30, 2010

(51) Int. Cl.
*H04L 29/06* (2006.01)
(52) U.S. Cl. .............................. 726/7; 713/155; 713/170
(58) Field of Classification Search .................... None
See application file for complete search history.

(56) References Cited

U.S. PATENT DOCUMENTS

| | | | |
|---|---|---|---|
| 7,325,132 B2* | 1/2008 | Takayama et al. | 713/168 |
| 7,606,560 B2* | 10/2009 | Labrou et al. | 455/411 |
| 7,610,056 B2* | 10/2009 | Zapata et al. | 455/466 |
| 7,765,580 B2* | 7/2010 | Vandergeest et al. | 726/2 |
| 2002/0164026 A1* | 11/2002 | Huima | 380/247 |
| 2002/0169988 A1* | 11/2002 | Vandergeest et al. | 713/201 |
| 2003/0204726 A1 | 10/2003 | Kefford et al. | |
| 2004/0039919 A1* | 2/2004 | Takayama et al. | 713/180 |
| 2005/0039017 A1 | 2/2005 | Delany | |
| 2006/0206709 A1* | 9/2006 | Labrou et al. | 713/167 |
| 2006/0265243 A1* | 11/2006 | Racho et al. | 705/1 |
| 2007/0249375 A1* | 10/2007 | Zapata et al. | 455/466 |
| 2007/0269041 A1* | 11/2007 | Bhatnagar et al. | 380/30 |
| 2008/0034212 A1 | 2/2008 | Altieri | |
| 2008/0102766 A1* | 5/2008 | Schultz | 455/110 |
| 2008/0102790 A1* | 5/2008 | Schultz | 455/410 |
| 2008/0123850 A1* | 5/2008 | Bhatnagar et al. | 380/259 |
| 2009/0006258 A1* | 1/2009 | Ross | 705/59 |
| 2009/0007245 A1* | 1/2009 | Schultz | 726/5 |
| 2009/0119190 A1* | 5/2009 | Realini | 705/30 |
| 2009/0164783 A1* | 6/2009 | Solis et al. | 713/168 |
| 2009/0319797 A1* | 12/2009 | Tornqvist | 713/176 |

OTHER PUBLICATIONS

International Search Report mailed Jul. 19, 2010 in corresponding PCT Application No. PCT/SE2010/050172.
Written Opinion mailed Jul. 19, 2010 in corresponding PCT Application No. PCT/SE2010/050172.

* cited by examiner

*Primary Examiner* — Philip Chea
*Assistant Examiner* — Oscar Louie
(74) *Attorney, Agent, or Firm* — Nixon & Vanderhye, P.C.

(57) ABSTRACT

A method of operating a user terminal connected to the Internet comprises: prior to sending an email from the user terminal to a recipient, sending an identifier of the email content and a telephone number to a server; receiving a verification code from the server via the Internet; receiving an authentication string from the server via the Internet; including the authentication string and the telephone number in the email; and sending the email to the recipient.

22 Claims, 5 Drawing Sheets

METHOD AND APPARATUS FOR EMAIL COMMUNICATION

TECHNICAL FIELD

The technology described herein relates to a method and apparatus for email communication. More particularly, the technology described herein relates to verifying, to a recipient of an email, that the sender possesses a specific phone number.

BACKGROUND

Today a large proportion of people have at least one email (electronic mail) account, and there are a variety of ways in which an individual can obtain an email account. For example, a user's employer may provide them with an email account, or when a user subscribes to an Internet Service Provider (ISP) they will usually be provided with at least one email account. In addition, a user can create an email account with one of a number of email services, such as Google's Gmail®, Microsoft's Hotmail® etc.

Each email account is associated with at least one email address that is unique to that account, and therefore allows any emails sent to this address to be delivered appropriately. Email addresses take the form "local-part@domain", wherein the domain identifies the entity/entities that host the account associated with the email address, and the local-part identifies the individual email account to the host (see, for example, IETF RFC 5321).

When creating an email account, it is often the case that a user is free to define what the local-part of their email address will be, provided that it is unique to the host. As such, a recipient of an email cannot necessarily rely on the email address as a means for correctly identifying the sender. For example, an email sent from the email address "john.smith@emailservice.com" may not be from an individual whose name is actually John Smith. Furthermore, even if the local-part of the email address does in some way accurately represent the actual name of the sender, the recipient of the email can not be certain which particular individual the email is from. This is particularly true of those email addresses wherein the domain part of the email address identifies a host that allows anybody to create an email address.

SUMMARY

According to a first aspect of the technology described herein there, is provided a method of verifying to a recipient of an email that a sender of the email possesses a mobile telecommunications device associated with a specific telephone number. The method comprises at the sender, sending an identifier of the email content and the telephone number to a server via the Internet, at the server, receiving the identifier and the phone number from the sender, generating a verification code, sending the verification code to the sender via the Internet, and storing the verification code with the identifier and the telephone number, at the sender, receiving the verification code from the server and returning the verification code to the server in a Short Message Service message sent by said mobile telecommunications device, at the server, confirming that the received verification code and the telephone number from which the Short Message Service message originated match the stored telephone number and verification code, and then using the telephone number and the identifier to generate an authentication string, and sending the authentication string to the sender via the Internet, at the sender, receiving the authentication string from the server, and sending the email including said authentication string and said telephone number to the recipient via the Internet, at the recipient, receiving the email, and forwarding the authentication string, the telephone number and the identifier of the received email content to said or another server, and at the receiving server, receiving the authentication string, the telephone number and the identifier, generating an authentication string using the received telephone number and identifier, confirming that the received authentication string is the same as the generated authentication string, and sending confirmation to the recipient.

The method may further comprise, at the server, when sending the verification code to the sender via the Internet, starting a timer, when the verification code is received from the sender, determining if the timer has expired, and only confirming that the received verification code and the telephone number from which the Short Message Service message originated match the stored telephone number and verification code if the timer has not expired.

The method may further comprise, at the sender, including the identifier of the email content in the email sent to the recipient. Alternatively, if the identifier of the email content comprises a hash value of the email content, then the method may further comprise generating the hash value of the email content.

According to a second aspect of the technology described herein there is provided method of operating a user terminal connected to the Internet. The method comprises, prior to sending an email from the user terminal to a recipient, sending an identifier of the email content and a telephone number to a server, receiving a verification code from the server via the Internet, receiving an authentication string from the server via the Internet, including the authentication string and the telephone number in the email; and sending the email to the recipient.

The method may further comprise, including the identifier of the email content in the email sent to the recipient Alternatively, if the identifier of the email content comprises a hash value of the email content, then the method may further comprise generating the hash value of the email content.

An email client of the user terminal may automatically perform the steps of generating the hash value of the email content and sending the hash value and the telephone number to the server. These steps may be performed automatically upon an input from a user of the user terminal. The step of including the authentication string and the telephone number in the email may also be performed automatically, by an email client of the user terminal, when the authentication string is received.

According to a third aspect of the technology described herein there is provided method of operating a server. The method comprises receiving, from a sender of an email, an identifier of the email content and a telephone number, generating a verification code, sending the verification code to the sender via the Internet, storing the verification code with the identifier and the telephone number, receiving the verification code that has been returned to the server in a Short Message Service message, determining if the received verification code and the telephone number from which the Short Message Service message originated match a verification code and telephone number, and, if so, using the telephone number and the identifier to generate an authentication string, and sending the authentication string to the sender via the Internet.

When sending the verification code to the sender via the Internet the method may further comprise, starting a timer, and then, when the verification code is received from the sender, determining if the timer has expired, and only confirming that the received verification code and the telephone number from which the Short Message Service message originated match the stored telephone number and verification code if the timer has not expired.

According to a fourth aspect of the technology described herein there is provided method of operating a server. The method comprises receiving, from a recipient of an email, a string, a telephone number and an identifier of the email content, generating an authentication string using the received telephone number and identifier, determining if the received string is the same as the generated authentication string, and sending a message to the recipient confirming whether or not the sender of the email content possesses a mobile telecommunications device associated with the telephone number.

According to a fifth aspect of the technology described herein there is provided a method of operating a user terminal connected to the Internet. The method comprises receiving an email from a sender, said email including a string and a telephone number, sending the string, the telephone number and an identifier of the email content to a server, and receiving a message from the server confirming whether or not the sender of the email content possesses a mobile telecommunications device associated with the telephone number.

If the identifier of the email content comprises a hash value of the email content, the method may further comprise, generating the hash value of the email content.

The step of sending the string, the telephone number and an identifier of the email content to a server may be performed automatically, by an email client of the user terminal, when the email including a string and a telephone number is received. This step may be performed automatically upon an input from a user of the user terminal.

According to a sixth aspect of the technology described herein there is provided an apparatus configured to operate as a user terminal. The apparatus comprises an email client for generating an email to a recipient, and for inserting an authentication string and a telephone number into the email prior to sending the email, a transmitter for sending an identifier of email content and the telephone number to a server, a receiver for receiving a verification code from the server and for receiving the authentication string for the email from the server, and a transmitter for sending the email including the authentication string and the telephone number to the recipient.

The email client may be arranged to generate the identifier by applying a hash function to the email content.

According to a seventh aspect of the technology described herein there is provided an apparatus configured to operate as a server. The apparatus comprises a receiver for receiving, from a sender of an email, an identifier of the email content and a telephone number, a code generation unit for generating a verification code, a transmitter for sending the verification code to the sender via the Internet, a memory for storing the verification code with the identifier and the telephone number, a receiver for receiving a verification code that has been returned to the server in a Short Message Service message, a processing unit for determining if the received verification code and the telephone number from which the Short Message Service message originated match a stored verification code and telephone number, and, if so, for using the telephone number and the identifier to generate an authentication string, and a transmitter for sending the authentication string to the sender via the Internet.

The apparatus may further comprise a timer that is started when the verification is sent to the sender, wherein the processing unit is arranged to determine if the timer has expired when the verification code is received from the sender, and to only confirm that the received verification code and the telephone number from which the Short Message Service message originated match the stored telephone number and verification code if the timer has not expired.

According to an eighth aspect of the technology described herein there is provided an apparatus configured to operate as a server. The apparatus comprises a receiver for receiving, from a recipient of an email, a string, a telephone number and an identifier of the email content, a processing unit for generating an authentication string using the received phone number and identifier, a processing unit for determining if the received string is the same as the generated authentication string, and a transmitter for sending a message to the recipient, the message confirming whether or not the received string is the same as the generated authentication string.

According to a ninth aspect of the technology described herein there is provided apparatus configured to operate as a user terminal. The apparatus comprises a receiver for receiving an email from a sender, the email including a string and a telephone number, an email client for extracting the string and the telephone number, a transmitter for sending the string, the telephone number and an identifier of the email content to a server, and a receiver for receiving, from the server, a message indicating whether or not the sender of the email content possesses a mobile telecommunications device associated with the telephone number.

If the email from the sender also includes the identifier, the email client may be arranged to extract the identifier from the email. Alternatively, the email client may be arranged to generate the identifier by applying a hash function to the email content.

According to a tenth aspect of the technology described herein there is provided a method of operating an email client. The method comprises prior to sending an email to a recipient, generating an identifier of the email content, sending the identifier and a telephone number to a server, receiving a verification code from the server, displaying the verification code to the user, receiving an authentication string from the server, including the authentication string and the telephone number in the email, and sending the email to the recipient.

The method may further comprise including the identifier of the email content in the email sent to the recipient. Alternatively, the identifier of the email content may be generated comprises a hash value generated by applying a hash function to the email content.

According to an eleventh aspect of the technology described herein there is provided method of operating an email client. The method comprises upon receipt of an email including a string and a telephone number, sending the string, the telephone number and an identifier of the email content to a server, and receiving a message from the server confirming whether or not the sender of the email content possess a mobile telecommunications device associated with the telephone number.

If the identifier of the email content comprises a hash value of the email content, the method may further comprise generating the hash value of the email content.

DETAILED DESCRIPTION

It is recognised here that a large proportion of individuals have access to a mobile telecommunication device, and that it will often be the case that most, if not all, of the people that an individual is likely to contact will know and trust the telephone number belonging to this individual. As such, there will now be described a method by which the sender of an email can verify, to the recipient, that he/she possesses a specific telephone number, therefore providing the recipient with means for confirming the identify of the sender. The method involves using a Short Message Service (SMS) message, sent from the sender of an email to a server, to verify to the server that the sender has access to a specific telephone number. The server can then confirm this to the recipient of email.

Figure 1:
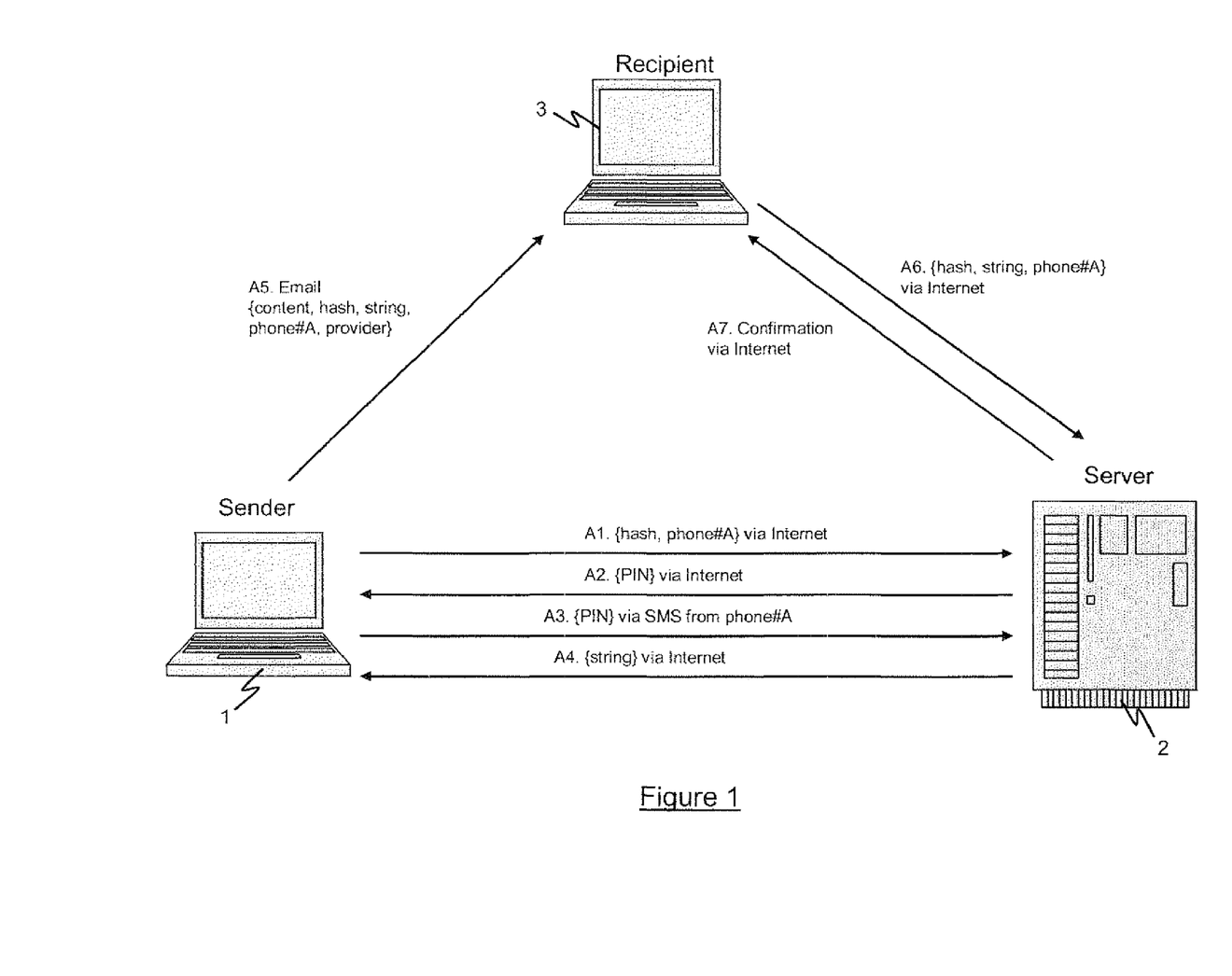
FIG. 1 illustrates schematically an example of the process by which the sender of an email can verify, to the recipient, that he/she has access to a specific phone number.

FIG. 1 illustrates schematically an example of the process of associating an email with a telephone number of the sender, and verifying this to the recipient. The steps performed are as follows:

A1. The sender 1 generates the content of an email that he/she wishes to send. The email client at the sender 1 then generates an identifier for the email content. For example, the sender 1 can apply a hash function to this content to generate a hash value. This hash value is then sent, together with the sender's telephone number, to a verification server 2 via the Internet.

A2. The server 2 receives the hash value and telephone number from the sender 1, generates a short verification code or PIN, stores the PIN together with the hash value and the telephone number, and returns this PIN to the sender 1 via the Internet. At the same time the server 2 starts a timer that runs for a predefined time. The PIN sent to the sender 1 is only valid for the duration of this timer.

A3. When the sender 1 receives the PIN from the server 2, he/she uses a mobile telecommunications device that is associated with the telephone number to return the PIN to the server 2 in a SMS message. Alternatively, the sender 1 could use their mobile telecommunications device to call a number associated with the server 2 and, once connected, to type or dial in the PIN.

A4. When the server 2 has received the PIN it determines whether or not the timer has expired. Provided that the timer has not yet expired, the server 2 then verifies that the received PIN and the telephone number from which the SMS originates matches the PIN and telephone number stored in the server's memory. Provided that this is the case, the server 2 then uses the phone number and the hash value as inputs to some process or function, that generates an authentication string. The authentication string should be unique to that combination of hash value and telephone number. For example, the authentication string could be generated by the application of a hash function to the concatenation of the hash value of the email content and the telephone number. The server 2 returns this authentication string to the sender 1 via the Internet.

A5. When the sender 1 receives the authentication string, they can then include this authentication string, the hash value of the email content and their telephone number in the email. The email is then sent to the recipient 3. The email should also include the identity of the service provider that the recipient 3 should contact in order to verify the association between the authentication string, the hash value, and the telephone number.

A6. When the recipient 3 receives the email they can then forward the authentication string, the hash value and the telephone number to the server 2. The recipient 3 can use the identity of the service provider, which was also sent with the email, to determine the appropriate server 2 to contact.

A7. The server 2 then uses the telephone number and the hash value received from the recipient 3 as inputs to the same process or function, as that used in step A4, in order to generate a string. The server 2 then determines if this generated string is the same as the string received from the recipient 3. If so, the server 2 can confirm, to the recipient, that the sender 1 of the email content possesses a mobile telecommunications device associated with that telephone number.

In addition, by applying the same hash function to the content of the received email, the recipient 3 can then compare this with the received hash value to confirm that the email content is the same as that originally verified by the server. Alternatively, if the email from the sender did not include the hash value, the recipient could make use of the same hash function as used by the sender to generate the hash value. This hash value would then be sent to the server together with the telephone number and the authentication string. In this case, only if the content of the received email is the same as that used to create the hash value sent to the server by the sender, will the generated string match the string sent with the email.

Figure 2:
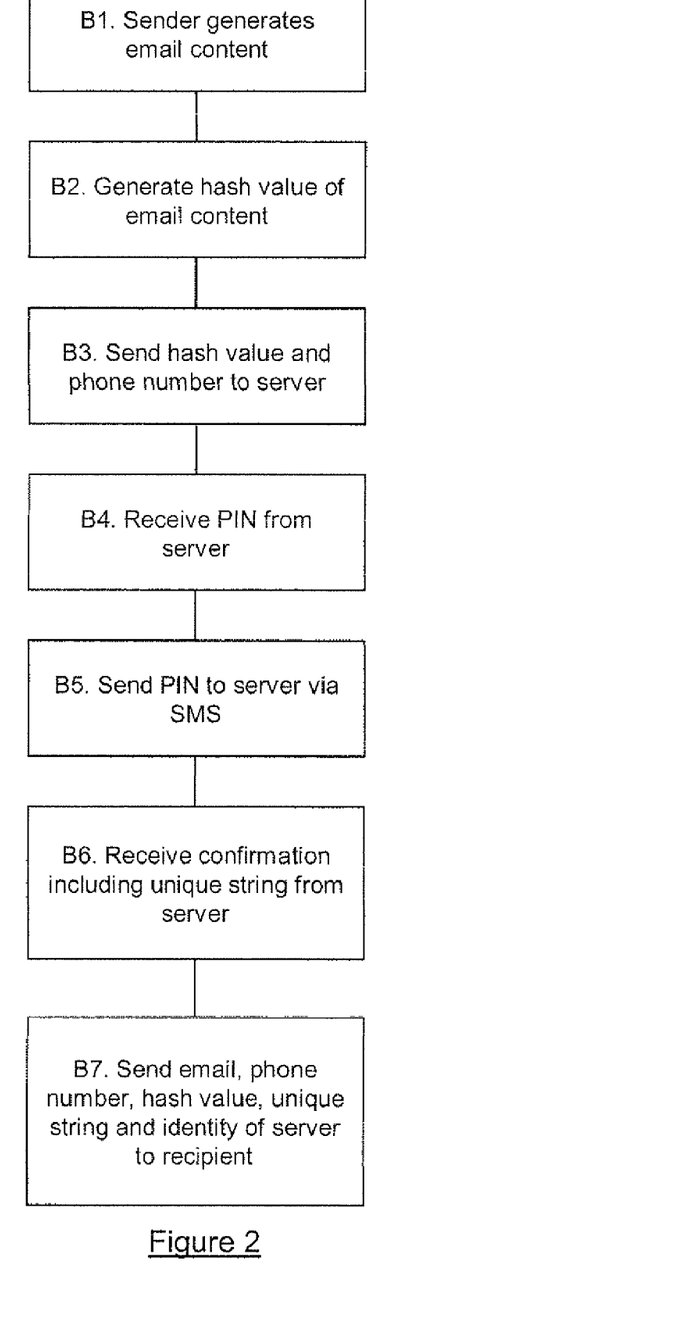
FIG. 2 is a flow diagram illustrating the process implemented by the sender of an email.

FIG. 2 is a flow diagram illustrating the process implemented by the sender of an email in order to verify that they have access to a specific telephone number. The steps performed are as follows:

B1. The sender 1 generates the content of an email to be sent.

B2. The email client, or some other application, of the sender 1 can then apply a hash function to this content to generate a hash value.

B3. The sender then sends this hash value together with the sender's telephone number to a server 2 via the Internet.

B4. The sender 1 then receives a verification code or PIN from the server 2.

B5. The sender 1 then returns the PIN to the server 2 in a Short Message Service message from the mobile telecommunications device associated with the sender's telephone number. Alternatively, the sender 1 could use their mobile telecommunications device to call a number associated with the server 2 and, once connected, to type or dial in the PIN.

B6. The sender 1 then receives confirmation from the server 2 that the sender's telephone number has successfully been verified, the confirmation including an authentication string.

B7. The email client at the sender 1 then automatically includes this authentication, the identifier and the sender's telephone number in the email and sends the email to the recipient.

Figure 3:
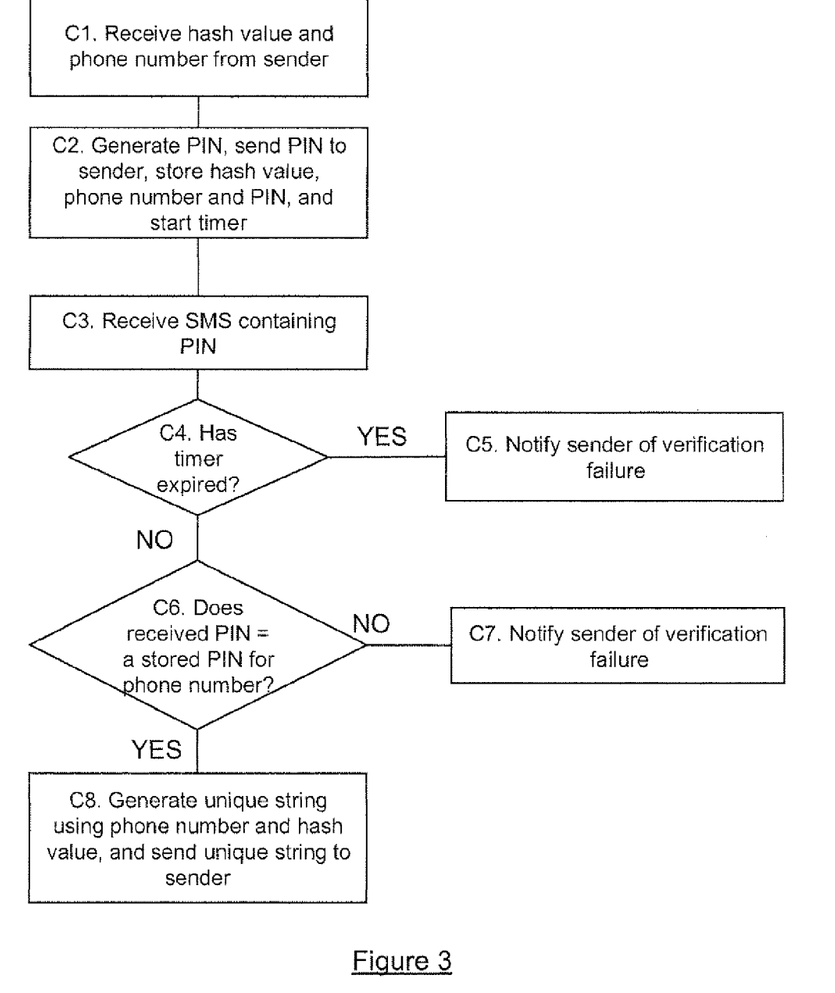
FIG. 3 is a flow diagram illustrating the process implemented by a verification server when interacting with a sender of an email.

FIG. 3 is a flow diagram illustrating the process implemented by the verification server in order to verify that the sender of an email possesses a specific telephone number. The steps performed are as follows:

C1. The server 2 receives a hash value and a telephone number from the sender 1

C2. The server 2 generates a short verification code or PIN, sends this PIN to the sender 1 via the Internet, stores the PIN together with the hash value and the phone number, and starts a timer, C3. The server 2 receives a PIN that has been sent in a SMS message.

C4. The server 2 then determines if the timer has expired.

C5. If the timer has expired, the server 2 notifies the sender that the verification has failed, and erases the record of the hash valuer the telephone number and the PIN from its memory.

C6. If the timer has not expired, the server 2 then determines if the received PIN and the telephone number from which the SMS originated matches a PIN and a telephone number stored in its memory.

C7. If it is determined that the received PIN and the telephone number from which the SMS originated does not match a PIN and telephone number stored in the memory, then the server 2 notifies the sender 1 that the verification of the phone number has failed.

C8. If it is determined that the received PIN and the telephone number from which the SMS originated does match a PIN and telephone number stored in the memory, then the server 2 makes use of the telephone number and hash value as inputs to some process or function in order to generate an authentication string. For example, the authentication string could be generated by the application of a hash function to the concatenation of the hash value of the email content and the telephone number. The server 2 then sends the authentication string to the sender 1 via the Internet.

Figure 4:
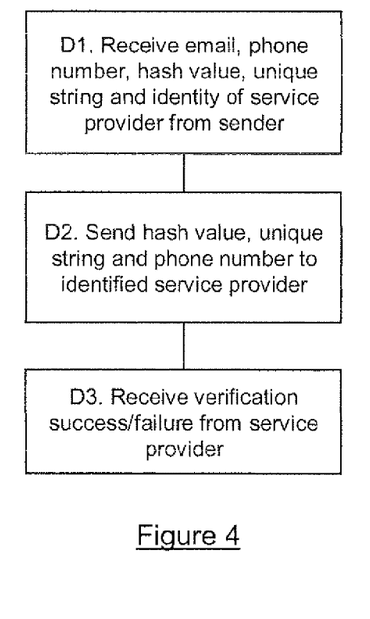
FIG. 4 is a flow diagram illustrating the process implemented by the recipient of an email.

Once the sender of an email has verified their phone number to the server, and received an authentication string, the sender can then send the email to the recipient. The sender must at least include the verified phone number and the authentication string in the email. FIG. 4 is a flow diagram illustrating the process implemented by the recipient of an email in order to verify that the sender of the email possesses a mobile telecommunications device associated with the telephone number that has been included with the email. The steps performed are as follows:

D1. The recipient 3 receives an email from a sender. The email includes a telephone number, a hash value, a string and the identity of a service provider.

D2. The recipient 3 makes use of the identity of the service provider to identify a server 2 to contact. The recipient 2 then sends the string, the hash value and the telephone number to the identified server 2. This could be performed automatically by the recipient's email client.

D3. The recipient 3 receives a response from the server 2 confirming whether or not the sender of the email possesses a mobile telecommunications device associated with the telephone number.

Figure 5:
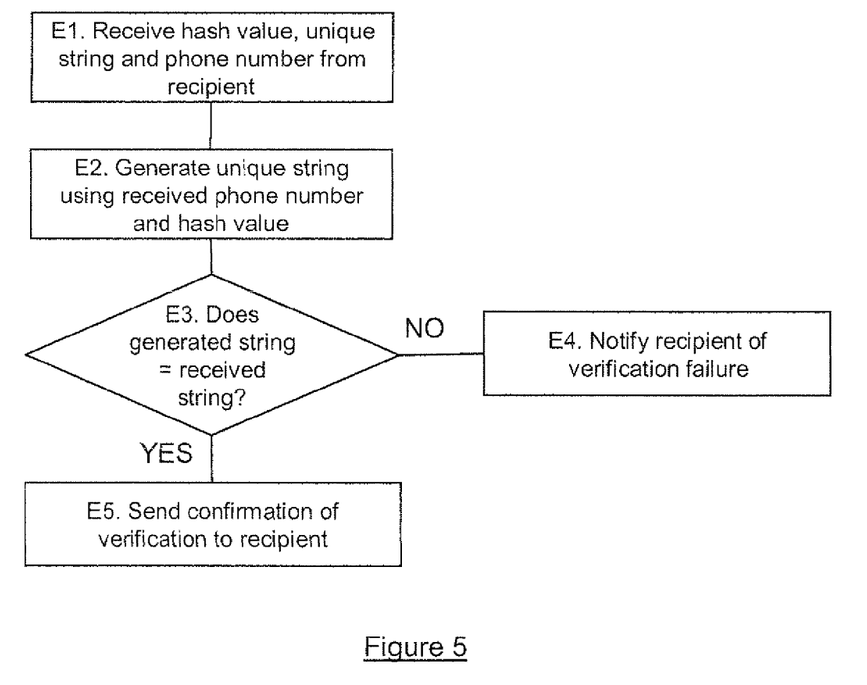
FIG. 5 is a flow diagram illustrating the process implemented by a verification server when interacting with a recipient of an email.

FIG. 5 is a flow diagram illustrating the process implemented by the verification server in order to confirm, to the recipient of an email, that the sender of the email possesses a specific telephone number. The steps performed are as follows:

E1. The server 2 then receives a hash value, a string and a telephone number from a recipient 3.

E2. The server 2 then uses the telephone number and the hash value received from the recipient 3 as inputs to a process or function, which is the same as that used in step C8 above, in order to generate a string.

E3. The server 2 then determines if this generated string is the same as the string received from the recipient 3.

E4. If the generated string is not the same as the received string, then the server 2 notifies the recipient 3 that the verification of the phone number has failed.

E5. If the generated string is the same as the received string, then the server sends confirmation to the recipient 3 that the sender 1 of the email content possesses a mobile telecommunications device associated with the telephone number.

As previously described, by applying the same hash function to the content of the received email, the recipient 3 can then compare this with the received hash value to confirm that the email content is the same as that originally verified by the server. Alternatively, if the email from the sender did not include the hash value, the recipient could make use of the same hash function as used by the sender to generate the hash value. This hash value would then be sent to the server together with the telephone number and the authentication string. In this case, only if the content of the received email is the same as that used to create the hash value sent to the server by the sender, will the generated string match the string sent with the email.

The method described above allows the sender of an email to provide the recipient with means for confirming the identity of the sender, by verifying that he/she possesses a mobile telecommunications device associated with a specific telephone number. The server used to provide this verification will usually belong to a service provider trusted by both the sender and the recipient. In providing that the verification code or PIN is returned to the server in an SMS message, the method provides that the server can verify that the sender possesses the telephone number. Furthermore, by providing that the PIN must be sent from the sender to the server, in an SMS message, the service provider has means for charging the sender for the verification service.

The generation of the authentication string using the hash value of the email content and the sender's telephone number provides that the server does not need to store this string, thereby reducing the burden on the server's memory. As such, when the server is required to provide confirmation to the recipient, it can simply use the hash value and telephone number received from the recipient to recreate the authentication string. Only if the hash value and telephone number are the same as those used to create the received string, will the generated string match the received string. The function or process used to create the authentication string should therefore ensure that the string will be unique for the particular combination of email content and telephone number, and should also be such that it cannot easily be inverted. For example, the authentication string could be generated by the application of a hash function, known only to the server, to the concatenation of the hash value of the email content and the telephone number.

Figure 6:
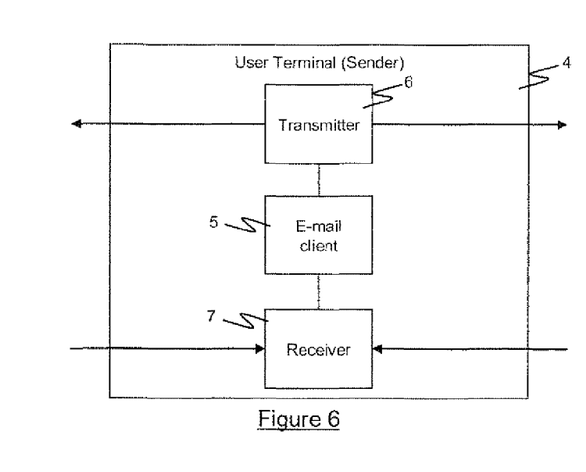
FIG. 6 illustrates schematically an example of the user terminal of a sender of an email.

FIG. 6 illustrates schematically an example of user terminal 4 to be used to send an email, and suitable for implementing the method described above. The user terminal 4 can be implemented as a combination of computer hardware and software. The user terminal 4 comprises an email client 5, a transmitter 6 and a receiver 7. The email client 5 is suitable for generating an email from the user to a recipient and for applying a hash function to the email content to generate a hash value. The transmitter 7 is suitable for sending the hash value of the email content and a phone number to a server, and for sending the email together with a unique string and the phone number to the recipient. The transmitter 7 may also be suitable for sending the hash value of the email content with the email to the recipient. The receiver 8 is suitable for receiving a PIN from the server and for receiving a unique string for the email from the server.

Figure 7:
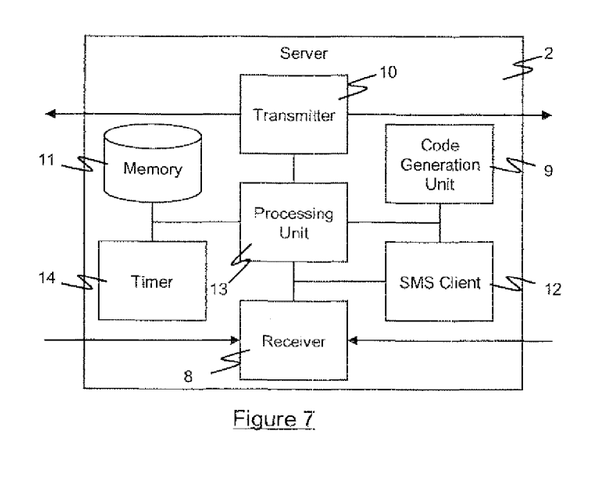
FIG. 7 illustrates schematically an example of a verification server.

FIG. 7 illustrates schematically an example of a verification server 2 suitable for implementing the method described above. The server 2 can be implemented as a combination of computer hardware and software. The server 2 comprises a receiver 8, a code generation unit 9, a transmitter 10, a memory 11, a SMS client 12 and a processing unit 13. The receiver 8 is suitable for receiving, from a sender of an email, a hash value of the email content and a phone number. The PIN generation unit 9 is suitable for generating a PIN. The transmitter 10 is suitable for sending the PIN and for sending a unique string to the sender via the Internet. The memory 11 is suitable for storing the PIN with the hash value and the phone number. The SMS client 12 is suitable for receiving a Short Message Service message including a PIN.

The processing unit 13 is suitable for verifying the phone number if the received PIN matches the stored PIN, and, if so, for using the phone number and the hash value to generate the unique sting for the email. The server 2 may also comprise a timer 14 that is started when the PIN is sent to the sender. The processing unit 13 will then only verify the phone number if a Short Message Service message including the PIN is received prior to expiration of the timer 14.

In addition, the receiver 8 is also suitable for receiving, from a recipient of an email, a string, a phone number and a hash value of the email content. The processing unit 13 is also suitable for determining if the received string is the same as a unique string generated using the received phone number and hash value, and, if so, verifying that the sender of the email content has access to the phone number, and the transmitter 10 is also suitable for sending a message to the recipient, the message indicating whether or not the verification has been successful.

Figure 8:
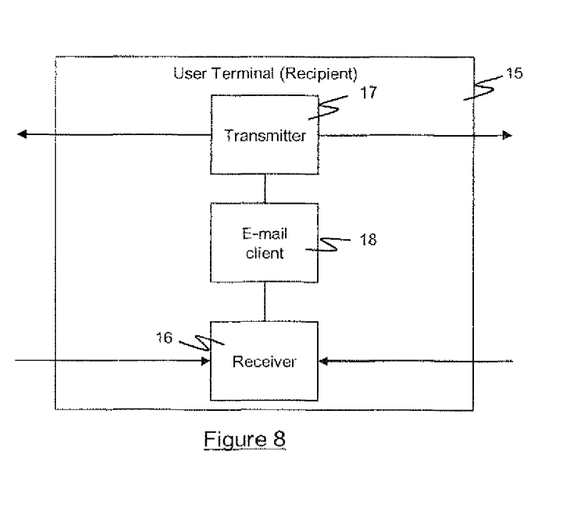
FIG. 8 illustrates schematically an example of user terminal of a recipient of an email.

FIG. 8 illustrates schematically an example of user terminal 15 used to receive an email, and suitable for implementing the method described above. The user terminal 15 can be implemented as a combination of computer hardware and software. The user terminal 15 comprises a receiver 16, a transmitter 17 and an email client 18. The receiver 16 is suitable for receiving an email from a sender, together with a string and a phone number, and for receiving, from the server, verification that the sender of the email content has access to the phone number. The transmitter 17 is suitable for sending the string, the phone number and a hash value of the email content to a server. The email client 18 is suitable for applying a hash function to the email content to generate the hash value, and for automatically extracting the string and the telephone number from the email.

It will be appreciated by the person of skill in the art that various modifications may be made to the above-described embodiments without departing from the scope of the technology described herein.

The invention claimed is:

1. A method of verifying to a recipient of an email that a sender of the email possesses a mobile telecommunications device associated with a specific telephone number, the method comprising:
    at the sender, sending an identifier of the email content and the telephone number to a server via the Internet;
    at the server, receiving the identifier and the phone number from the sender, generating a verification code, sending the verification code to the sender via the Internet, and storing the verification code with the identifier and the telephone number;
    at the sender, receiving the verification code from the server and returning the verification code to the server in a Short Message Service message sent by said mobile telecommunications device;
    at the server, confirming that the received verification code and the telephone number from which the Short Message Service message originated match the stored telephone number and verification code, and then using the telephone number and the identifier to generate an authentication string, and sending the authentication string to the sender via the Internet;
    at the sender, receiving the authentication string from the server, and sending the email including said authentication string and said telephone number to the recipient via the Internet;
    at the recipient, receiving the email, and forwarding the authentication string, the telephone number and the identifier of the received email content to said server or another server; and
    at the receiving server, receiving the authentication string, the telephone number and the identifier, generating a confirmation authentication string using the received telephone number and identifier, confirming that the received authentication string is the same as the confirmation authentication string, and sending confirmation to the recipient.

2. A method as claimed in claim 1, and further comprising:
    at the server, when sending the verification code to the sender via the Internet, starting a timer, when the verification code is received from the sender, determining if the timer has expired, and only confirming that the received verification code and the telephone number from which the Short Message Service message originated match the stored telephone number and verification code if the timer has not expired.

3. A method as claimed in claim 1, and further comprising:
    at the sender, including the identifier of the email content in the email sent to the recipient.

4. A method as claimed in claim 1, wherein the identifier of the email content comprises a hash value of the email content, and the method further comprises generating the hash value of the email content.

5. A method of operating an email client on a user terminal connected to the Internet, the method comprising:
    prior to sending an email from the user terminal to a recipient, sending an identifier of the email content and a telephone number of a mobile telecommunications device in possession of the user of the user terminal to a server;
    in response to the sending, receiving a verification code from the server via the Internet;
    returning the verification code to the server via a short message service (SMS) message sent by the mobile telecommunications device;

subsequent to the returning, receiving an authentication string from the server via the Internet;

embedding the authentication string and the telephone number in the email; and sending the email to the recipient.

6. A method as claimed in claim 5, and further comprising: including the identifier of the email content in the email sent to the recipient.

7. A method as claimed in claim 5, wherein the identifier of the email content comprises a hash value of the email content, and the method further comprises generating the hash value of the email content.

8. A method as claimed in claim 7, wherein an email client of the user terminal automatically performs the steps of generating the hash value of the email content and sending the hash value and the telephone number to the server.

9. A method as claimed in claim 5, wherein the step of including the authentication string and the telephone number in the email is performed automatically, by an email client of the user terminal, when the authentication string is received.

10. A method of operating a server, the method comprising:

receiving, from a sender of an email, an identifier of the email content and a telephone number;

generating a verification code;

sending the verification code to the sender via the Internet;

storing the verification code with the identifier and the telephone number;

receiving the verification code that has been returned to the server in a Short Message Service message; and determining if the received verification code and the telephone number from which the Short Message Service message originated match the verification code and the telephone number, and, if so, using the telephone number and the identifier to generate an authentication string, and sending the authentication string to the sender via the Internet.

11. A method as claimed in claim 10, and further comprising:

when sending the verification code to the sender via the Internet, starting a timer, when the verification code is received from the sender, determining if the timer has expired, and only confirming that the received verification code and the telephone number from which the Short Message Service message originated match the stored telephone number and verification code if the timer has not expired.

12. A method of operating a server, the method comprising:

the server receiving, from a recipient of an email, an authentication string, a telephone number of a mobile telecommunications device in possession of a sender, and an identifier of the email content;

the server generating a confirmation authentication string using the received telephone number and identifier;

the server determining if the received authentication string is the same as the generated confirmation authentication string; and in response to determining whether the received authentication string is the same as the generated confirmation authentication string, the server sending a message to the recipient confirming whether or not the sender of the email content possesses the mobile telecommunications device associated with the telephone number.

13. A method of operating an email client on a user terminal connected to the Internet, the method comprising:

receiving an email from a sender, said email including an authentication string and a telephone number of a mobile telecommunications device in possession of the sender;

sending the authentication string, the telephone number, and an identifier of the email content to a server; in response to the sending, receiving a message from the server confirming whether or not the sender of the email content possesses the mobile telecommunications device associated with the telephone number; and upon successful confirmation, accessing the email content by the email client on the user terminal.

14. A method as claimed in claim 13, wherein the identifier of the email content comprises a hash value of the email content, and the method further comprises generating the hash value of the email content.

15. An apparatus configured to operate as a user terminal, the apparatus comprising:

an email client configured to generate an email to a recipient, and for embedding an authentication string and a telephone number of a mobile telecommunications device in possession of a sender into the email prior to sending the email;

a network transmitter configured to send an identifier of email content and the telephone number to a server;

a network receiver configured to receive a verification code from the server and to receive the authentication string for the email from the server; and wherein the network transmitter is further configured to send the email including the authentication string, and the telephone number to the recipient.

16. An apparatus as claimed in claim 15, wherein the email client is arranged to generate the identifier by applying a hash function to the email content.

17. An apparatus configured to operate as a server, the apparatus comprising:

a communications receiver configured to receive, from a sender of an email, an identifier of the email content and a telephone number of a mobile telecommunications device in possession of the sender;

a code generation unit configured to generate a verification code;

a communications transmitter configured to send the verification code to the sender via the Internet;

a memory for storing the verification code with the identifier and the telephone number;

a telecommunications receiver for receiving the verification code that has been returned to the server in a Short Message Service message;

a processing unit for determining if the received verification code and the telephone number from which the Short Message Service message originated match a stored verification code and telephone number, and, if so, for using the telephone number and the identifier to generate an authentication string; and wherein the communications transmitter is further configured to send the authentication string to the sender via the Internet.

18. An apparatus as claimed in claim 17, the apparatus further comprising:

a timer that is started when the verification is sent to the sender, wherein the processing unit is arranged to determine if the timer has expired when the verification code is received from the sender, and to only confirm that the received verification code and the telephone number from which the Short Message Service message originated match the stored telephone number and verification code if the timer has not expired.

19. An apparatus configured to operate as a server, the apparatus comprising:
   a network receiver configured to receive, from a recipient of an email, an authentication string, a telephone number of a mobile telecommunications device in possession of a sender, and an identifier of the email content;
   a processing unit configured to generate a confirmation authentication string using the received phone number and identifier and to determine if the received authentication string is the same as the generated confirmation authentication string; and
   a network transmitter for sending a message to the recipient, the message confirming whether or not the sender of the email content possesses the mobile telecommunications device associated with the telephone number.

20. An apparatus configured to operate as a user terminal, the apparatus comprising:
   a network receiver configured to receive an email from a sender, the email including an authentication string and a telephone number of a mobile telecommunications device in possession of the sender;
   an email client configured to extract the authentication string and the telephone number;
   a network transmitter configured to send the authentication string, the telephone number and an identifier of the email content to a server; and
   the network receiver being further configured to receiving receive, from the server, a message indicating whether or not the sender of the email content possesses the mobile telecommunications device associated with the telephone number.

21. An apparatus as claimed in claim 20, wherein the email from the sender also includes the identifier and the email client is arranged to extract the identifier from the email.

22. An apparatus as claimed in claim 20, wherein the email client is arranged to generate the identifier by applying a hash function to the email content.

* * * * *